Sept. 23, 1958  H. A. KLIEGL  2,853,599
OVAL BEAM LENS
Filed May 17, 1956
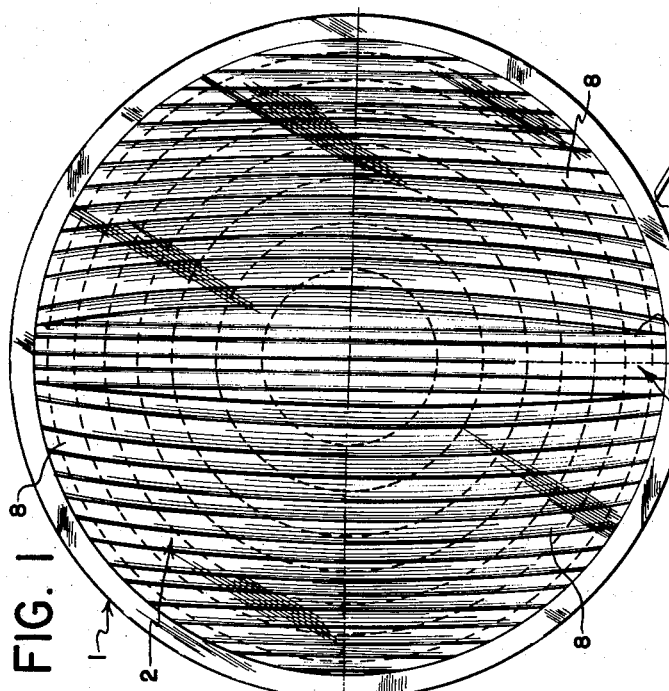
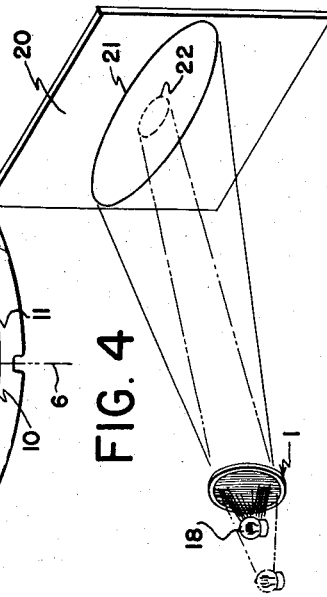
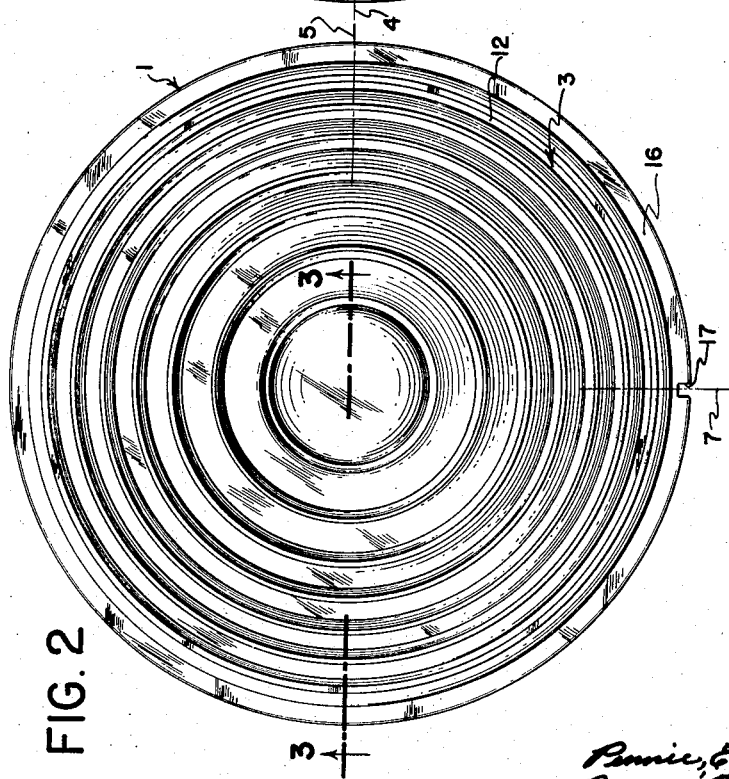
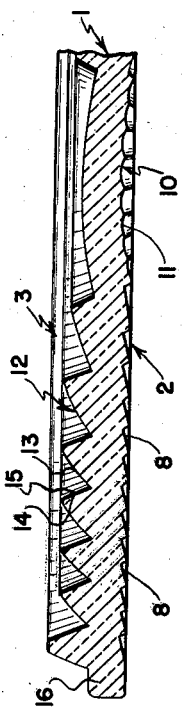
INVENTOR
Herbert A. Kliegl
BY
ATTORNEYS

United States Patent Office 2,853,599
Patented Sept. 23, 1958

2,853,599

OVAL BEAM LENS

Herbert A. Kliegl, Forest Hills, N. Y., assignor to Kliegl Bros. Universal Electric Stage Lighting Co., Inc., New York, N. Y., a corporation of New York Application May 17, 1956, Serial No. 585,473

3 Claims. (Cl. 240—106.1)

This invention relates to lenses, and more particularly to an illuminating spotlight lens comprising a novel combination of prisms for producing a light beam of oval cross-section having a substantially uniform light intensity throughout.

Effective illumination of theatrical stages presents many special problems. Generally the area of the stage to be illuminated is wider than it is high and the complete and uniform illumination of such a stage has heretofore required the use of several carefully adjusted spotlights of the round beam type. The only practical alternative means for producing a substantially oval or rectangular beam having uniform intensity has been to use a single round beam spotlight of exceptional size in conjunction with special shutters or "barn doors" which are adapted to intercept substantial segments of the round beam. Either technique, of course, is an inefficient means of utilizing the lighting equipment itself and the illumination it produces.

I have invented a compound lens to be employed in combination with a conventional circular spotlight housing to produce an oval or elliptical beam of light of uniform intensity. For a design of given focal length, my new oval beam lens will produce a beam of light having a cross-section which has a substantially constant ratio of width to height. This constant ratio is maintained whatever the position of the lens with respect to the light source from the spot position all the way to the flood position. Moreover, the beam produced by my new lens has a substantially uniform distribution of light intensity throughout its entire cross-section. Ordinarily, no special shutters need be used with my new lens. This results in the most efficient use of the available light from a spotlight of a given size.

The advantages of the illumination obtainable with my new lens are immediately apparent. For example, in lighting the stage front of a theatre from a balcony or other elevated location an oblong light pattern is required. This pattern must usually be slightly higher than a person on stage and, at the same time, of substantially greater width, inasmuch as the person generally moves to the right and left of a given location. Formerly, several round spotlights were necessary to effect such a light pattern. Now a single spotlight using my new lens will produce the same effect. Moreover, the greater width of the beam from a single source produces a more uniform spread of light to right and left and the resultant shadows are less noticeable. A more pleasing quality of illumination of the stage may be obtained with several units overlapping the various areas of the stage.

My new lens is also particularly useful for so-called back lighting of an entertainer. This is a technique that has come into wide use with the advent of television. The head and body of the entertainer are illuminated from a position above and slightly to the rear. Because the light pattern should not cover much more than the actor's height and the beam is inclined downwardly at a rather sharp angle, a lens must produce a rather small beam angle in one direction. Here again, the actor may move generally to right and left of the center of the beam and the extra width obtainable with my new lens means that the light covers a wider area permitting a freedom of movement for the actor which could otherwise only be had where several pieces of conventional round beam lighting equipment were used.

A still further example of stage illumination to which my new lens is particularly suited is that of side lighting where the lights are placed in the wings or side entrances of the stage and slightly above the entertainers. These side entrances are normally quite narrow. When conventional round beam lenses are used in the spotlights considerable illumination is lost due to the masking effect of the curtains around the entrance. When applied in this case, a lens according to my invention is oriented so that the smaller dimension of the oval beam is horizontal and the greater dimension of the beam is vertical. This obviously results in illuminating a much greater area across the stage with a spotlight of a given size. Moreover, the effect of side lighting from a single source is markedly different from that obtained from a plurality of sources.

According to my invention, then, I provide a spotlight lens, cast in one piece of glass, and having on its opposite faces cooperating lens elements which produce an oval shaped beam of uniform intensity and variable dimensions, but having within small limits, a constant ratio of height to width. In other words, my lens produces a beam having a greater divergence in two opposite directions parallel to a first diameter of the lens than the divergence in two opposite directions parallel to a second diameter perpendicular to the first diameter.

My new lens has on its light-incident, or rear face a plurality of arcuate ridges situated on each side of the second diameter referred to above. These arcuate ridges are disposed on the face of the lens so that they are concave with respect to the second diameter and each of them slopes outwardly and rearwardly of the lens. In effect, each ridge is a portion of a lens of negative or divergent refracting power. Generally, the refracting power of each ridge is different from that of adjacent ridges and the refracting power of each ridge may vary from the center to its outer edge.

On the light-emergent or front face of the lens, I provide a plurality of concentric annular ridges of positive or convergent refracting power. The relative dimensions of the ridges on the light-incident and light-emergent faces of the lens and their respective refracting powers are initially established according to well-known optical laws to produce an oval beam having any desired fixed ratio of height to width. Moreover, the dimensions of the lens elements may be designed to provide any desired focal length for the entire combination.

A feature of my new lens is that an object to be illuminated which is wider than it is high can be illuminated with greater intensity and uniformity throughout the lighted area than is possible with a conventional round beam spotlight of the same size and focal length. An additional feature is that the ratio of the width to the height of the beam is substantially constant over the entire range of positions of the lens with respect to the light source between the extremes of flood and spot positions. My invention may be embodied in lenses of all sizes and focal lengths and such lenses may be shuttered or "barn doored" with practically no loss of light intensity in the remaining beam.

A detailed description of a preferred embodiment of my invention is given in the following specification in which reference is made to the accompanying drawings.

In these drawings:

Fig. 1 is a plan view of the rear or light-incident face of a spotlight lens;

Fig. 2 is a plan view of a front or light-emergent face of a spotlight lens;

Fig. 3 is a partial cross-section of the lens of Figs. 1 and 2 taken along the section line 3—3 of Fig. 2; and Fig. 4 is a view illustrating the operation of the lens of Figs. 1 and 2.

This embodiment of my invention comprises a single piece of cast glass 1 which is circular in outline and is generally flat. Fig. 1 represents the light-incident face 2 of the lens and will sometimes be referred to as the rear face. Fig. 2 represents the light-emergent face 3 of the lens and will sometimes be referred to as the front face. For purposes of orientation in the following description, I will designate the horizontal diameters indicated at 4 and 5 of Figs. 1 and 2, respectively, as the first diameters and the vertical diameters 6 and 7 of Figs. 1 and 2, respectively, as the second diameters.

To visualize the complete lens, the reader should imagine that Fig. 1 is placed back to back with Fig. 2. Then, viewing the combination along the section lines 3—3 of Fig. 2, one obtains a cross-section as shown in Fig. 3 in which the upper portion corresponds to the light-emergent face of the lens and the lower portion corresponds to the light-incident face. It will be further understood that this lens is symmetrical about the first diameter and it is also symmetrical about the second diameter.

Referring now to Figs. 1 and 3, the light-incident face 2 of the lens comprises a plurality of arcuate ridges 8 to the left and right respectively of the second or vertical diameter 6 of the lens. As seen in Fig. 1, the arcuate ridges are concave with respect to the second diameter and their radii of curvature are substantially greater than the radius of the lens itself. There is also on the light-incident face a substantially flat central section 10 extending generally along the second diameter 6 on which there are no ridges but which may be specially formed as will be explained below. This central section is bounded by the inmost edges of the arcuate ridges 8 immediately to the left and right of the second diameter.

Each of the ridges 8 on the light-incident face of the lens is a lens surface of negative or divergent refracting power and generally slopes outwardly and rearwardly of the lens. This can best be seen in the cross-section of Fig. 3. Generally, these ridges will not be of uniform width throughout their lengths nor of the same refracting power. Moreover, each ridge has a variable refracting power from its centermost edge to its outermost edge. In practice the optical characteristics of each ridge will be individually adjusted to produce the desired height to width ratio of the resultant light beam. In the particular embodiment being described the inmost ridges are the widest in a direction along the first diameter 4 of the rear face of lens 2 and the ridges further removed from the center of the lens are progressively narrower in the same direction.

To obtain an even diffusion of illumination from the light passing through the central section and the wider ridges I have found it advantageous to provide flutes 11 on the surfaces of these elements of the lens. These flutes are quite shallow and are concave in cross-section when viewed from the rear of the lens. The flutes in the central section of the lens may be generally parallel to the second diameter 6 of the lens and the flutes on the surfaces of innermost ridges follow the curvatures of the ridges. The necessity for these flutes is determined in a particular case by the uniformity of illumination produced in a given area of the beam.

The light-emergent face 3 of the lens, as illustrated in Figs. 2 and 3, is provided with annular ridges 12 which slope generally outwardly and rearwardly of the lens. The optically effective surfaces of the ridges are indicated at 13 and adjacent surfaces 13 are joined by surfaces 14 sloping outwardly and forwardly of the lens. These are preferably coated with an opaque, non-reflecting paint, as indicated at 15. These annular ridges are of progressively increasing refracting power, being positive or convergent spherical lens surfaces. The ridges on this light-emergent face of the lens constitute a conventional Fresnel lens surface.

An annular flange 16 is integrally cast with the lens body 1 and is used in conjunction with a conventional lens mounting means of any suitable type. So that the lens may be readily oriented in its mounting, I preferably provide a small notch 17 in the flange 16 at one extreme of either the first or second diameters of the lens.

With the foregoing description of the structure of my new lens in mind, its method of operation will be readily apparent to those skilled in the art. The arcuate ridges on the light-incident face of the lens tend to spread incident light by a greater amount in opposite directions parallel to the first diameter of the lens than they do in opposite directions parallel to the second diameter. On passing through the body of the lens and emerging through the surfaces of the annular ridges on the light-emergent side of the lens the light is further refracted and distributed to produce a resultant beam which is oval or substantially elliptical in cross-section. By properly proportioning the ridges on the light-incident and light-emergent faces of the lens and by proper adjustment of the respective refracting powers of the ridges, the distribution of light over the cross-section of the resultant beam may be made substantially uniform.

Referring now to Fig. 4, I have illustrated the operation of my new lens in conjunction with a light source 18 and a screen 20. The maximum uniformity of illumination produced with my new lens is obtained with so-called spotlight bulbs which have a series of upright and parallel filament coils arranged in either monoplane, biplane or barrelshaped construction. The lens may be used with other types of light sources and many advantages will still be realized.

With the bulb or light source relatively close to the light-incident face of the lens as indicated in solid outline at 21, and with the first diameters 4 and 5 of the light-incident and light-emergent faces 2 and 3, respectively, horizontal, the beam produced by the lens will have its greatest height and width at a given distance from the lens. In Fig. 4 it is clearly seen that the height of the beam projected on the panel is considerably less than the width of the beam. In any particular design of a lens incorporating my invention, the ratio of height to width of the beam may be given a desired value. For a given design, this ratio will remain substantially constant for any position of the light source with respect to the lens. I have illustrated at 22 in dotted outline the resultant beam produced by my new lens when the light source is relatively far from the lens. This relation of source to lens produces a beam whose absolute height and width are much less than before but retain the predetermined ratio. As the source of light is moved closer to the lens the absolute dimensions of the beam on a screen 20 at any given distance will increase, but the ratio of height to width will remain substantially uniform as previously stated.

My invention is defined in the following claims. The foregoing description of a particular embodiment is merely for purposes of illustration and the scope of the invention is not to be limited thereby.

I claim:

1. A spotlight for producing a beam of light having substantially uniform intensity throughout its cross-section and having greater divergence in opposite directions parallel to one diameter of the lens than the divergence in opposite directions parallel to another diameter perpendicular to said one diameter, the ratio of divergence in one direction to the divergence in the other direction being substantially constant, which spotlight comprises a lens and a light source adapted to be positioned at variable distance from the lens, said lens comprising a circular, substantially flat plate of glass having on the rear light-incident face thereof a system of arcuate ridges to each side of said other diameter and concave with respect thereto, each ridge of said system sloping outwardly and rearwardly of the lens, the ridges of said system having progressively greater radii of curvature from the inmost ridge outward, and each ridge being a portion of a negative lens surface, and said lens having thereon refractive means for converging some of the light transmitted through said light-incident face which refractive means is a system of substantially concentric annular ridges each of said annular ridges being a portion of a positive lens surface.

2. A spotlight for producing a beam of light having substantially uniform intensity throughout its cross-section and having greater divergence in opposite directions parallel to one diameter of the lens than the divergence in opposite directions parallel to another diameter perpendicular to said one diameter, the ratio of divergence in one direction to the divergence in the other direction being substantially constant, which spotlight comprises a lens and a light source adapted to be positioned at variable distance from the lens, said lens comprising a circular, substantially flat plate of glass having on the rear light-incident face thereof a system of arcuate ridges to each side of said other diameter and concave with respect thereto, each ridge of said system sloping outwardly and rearwardly of the lens, a substantially plane area between the inmost ridges, and each arcuate ridge being a portion of a negative lens surface, said plane area having flutes in the surface thereof, and said lens having thereon refractive means for converging some of the light transmitted through said light-incident face which refractive means is a system of substantially concentric annular ridges each of said annular ridges being a portion of a positive lens surface.

3. A spotlight for producing a beam of light having substantially uniform intensity throughout its cross-section and having greater divergence in opposite directions parallel to one diameter of the lens than the divergence in opposite directions parallel to another diameter of the lens perpendicular to said one diameter, the ratio of divergence in one direction to the divergence in the other direction being substantially constant, which spotlight comprises a lens and a light source adapted to be positioned at variable distance from the lens, said lens comprising a circular, substantially flat plate of glass having on a rear light-incident face thereof a plurality of arcuate ridges to each side of said other diameter and concave with respect thereto, the radius of curvature of each of said arcuate ridges being substantially greater than the radius of the flat plate, each of said ridges sloping outwardly and rearwardly of said lens, and each being a combination of negative lens surfaces, and said lens having thereon refractive means for converging some of the light transmitted through said light-incident face which refractive means is a system of substantially concentric annular ridges each of said annular ridges being a portion of a positive lens surface.

References Cited in the file of this patent

UNITED STATES PATENTS

| | | |
|---|---|---|
| 1,562,835 | Kuttler | Nov. 24, 1925 |
| 2,394,992 | Franck | Feb. 19, 1946 |

FOREIGN PATENTS

| | | |
|---|---|---|
| 523,288 | Great Britain | July 10, 1940 |